United States Patent
Garey et al.

(10) Patent No.: US 7,031,436 B1
(45) Date of Patent: Apr. 18, 2006

(54) SECURITY TELEPHONE (75) Inventors: William Garey, 101 Circle Dr., Arlington, TX (US) 76011; Vinh Le, Arlington, TX (US)

(73) Assignee: William Garey, Arlington, TX (US)

( * ) Notice: Subject to any disclaimer, the term of this patent is extended or adjusted under 35 U.S.C. 154(b) by 73 days.

(21) Appl. No.: 10/410,697

(22) Filed: Apr. 9, 2003

Related U.S. Application Data (60) Provisional application No. 60/444,583, filed on Feb. 3, 2003.

(51) Int. Cl.
   *H04M 11/00* (2006.01)
(52) U.S. Cl. .............................. 379/37; 379/40; 379/39
(58) Field of Classification Search ............. 379/37–51
   See application file for complete search history.

(56) References Cited

U.S. PATENT DOCUMENTS

| | | | | |
|---|---|---|---|---|
| 4,262,283 A | * | 4/1981 | Chamberlain et al. | 379/49 |
| 5,283,816 A | * | 2/1994 | Gomez Diaz | 379/40 |
| 5,568,535 A | * | 10/1996 | Sheffer et al. | 379/39 |
| 5,923,248 A | * | 7/1999 | Toledano et al. | 379/44 |
| 6,173,169 B1 | * | 1/2001 | Oh | 379/40 |
| 6,366,647 B1 | * | 4/2002 | Webb | 379/40 |
| 2003/0202639 A1 | * | 10/2003 | Chan | 379/39 |
| 2004/0086091 A1 | * | 5/2004 | Naidoo et al. | 379/37 |

* cited by examiner

*Primary Examiner*—Stella Woo (57) ABSTRACT

A telephone security device is built into a telephone unit. The device includes a sensor to detect an intrusion into the area in which the telephone is located. Upon detection of an event, the device places the telephone off hook, and triggers the redial feature of the telephone. This causes the telephone to redial the last number that had been called. The telephone then remains in the off hook condition for a delay interval to allow the recipient of the call to listen, via the telephone, for any sounds indication that an actual intrusion has occurred. In order to arm the security device, the user simply dials the number that is the intended recipient of the call, hang up, and switch on the sensor. Detection of a security event will then cause the last dialed number to be redialed.

16 Claims, 6 Drawing Sheets

SECURITY TELEPHONE

CROSS-REFERENCE TO RELATED APPLICATIONS

The present application claims priority based upon Provisional Application Filing No. 60/444,583, filed Feb. 3, 2003, titled ALARM TRANSMISSION APPARATUS, the entirety of which is hereby incorporated by reference.

BACKGROUND OF THE INVENTION

1. Field of the Invention

The present invention relates generally to security systems, and more specifically to a security device built into a telephone to protect an area in which the telephone is located.

2. Description of the Prior Art

Numerous security devices have been built or proposed that incorporate telephone devices. In particular, devices that allow a telephone set to protect an area in which the telephone is located have been proposed in the prior art.

Examples of such devices include the designs included in U.S. Pat. Nos. 4,027,103 and 6,263,069. In accordance with typical prior art designs, these devices will dial out to a preprogrammed number when a security event of a pre-established type is detected.

As will be appreciated by those skilled in the art, many of the devices heretofore proposed or made available add significant cost to the cost of a normal telephone device. Also, security devices incorporated into telephone devices are generally somewhat complicated to operate, leading to frustration and mistakes on the part of the person using them.

Normal electronic telephones, which are not enhanced by any type of security device, are inexpensive and reliable. Further, operation of the simple features of such phones is straightforward, and understood by almost all of those who use them. It would be desirable to provide a security telephone that is simple for anyone to use.

Many security telephone devices provide various features regarding how a security event is handled. In many cases, the function to be performed in case of a security event is to call a specified number or numbers to notify an appropriate person of the event. In the past, this call was often made to a police department or private security company.

However, the increase in the number of security systems being installed has led to problems caused by calls to the police department. An extremely large number of such automated calls turn out to be false alarms, which taxes the ability of the police department to provide normal services, due to the time involved in checking out such false alarms. As a result, many police departments no longer respond to calls placed by automated security systems, or at least charge a hefty fine for a response that turns out to be a false alarm.

Many security systems therefore automatically place calls to a security company, which will then take responsibility for checking out the cause of the call and contact the police department if an actual intrusion has occurred. However, these systems are also subject to a high percentage of false alarms, and can be relatively costly.

Telephone devices that incorporate the ability to place a call to a pre-programmed number have been proposed. However, such devices are relatively complex, and require that one or more numbers be programmed in advance. Programming and updating such numbers is a level of complexity that many consumers resist, preventing such devices from becoming widely accepted in the marketplace.

It would be desirable for a telephone security system to be incorporated into a standard telephone set, and add minimal overall cost to the device. It would further be desirable for such a system to provide flexibility for a user, and be extremely simple to use.

SUMMARY OF THE INVENTION

In accordance with the present invention, a telephone security device is built into a telephone unit. The device includes a sensor to detect an intrusion into the area in which the telephone is located. Upon detection of an event, the device places the telephone off hook, and triggers the redial feature of the telephone. This causes the telephone to redial the last number that had been called. The telephone then remains in the off hook condition for a delay interval to allow the recipient of the call to listen, via the telephone, for any sounds indication that an actual intrusion has occurred. In order to arm the security deice, the user simply dials the number that is the intended recipient of the call, hang up, and switch on the sensor. Detection of a security event will then cause the last dialed number to be redialed.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

The preferred embodiment set forth herein functions to efficiently perform the desired functions of the telephone security device. In particular, the circuits described herein comprise a simple set of additional circuitry that is easily added to an existing telephone device. Alternatively, the functions set forth herein can be incorporated into a telephone control chip to minimize parts count and cost. Those skilled in the art will appreciate the variations that can be made to the described device to perform its intended functions.

The device described below operates with a telephone that has an electronic control circuit. The features provided by the existing telephone include the ability to take the telephone set off hook by application of a voltage signal, and the ability to redial the previously dialed number by application of a second signal. Such telephone sets are widely available, and the redial function of the set has become a common feature for standard telephones.

Figure 1:
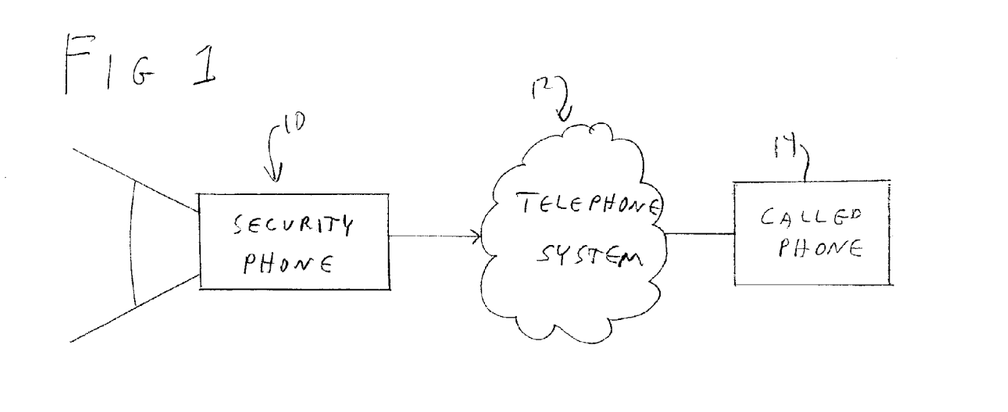
FIG. 1 is a block diagram illustrating operation of a preferred telephone security device.

Referring to FIG. 1, a security telephone according to the present invention is connected to the telephone system in any known manner. The security telephone 10 includes a sensor (not shown) that senses movement, or some other security event, in the area near the telephone. Preferably, an IR or similar motion detector is used, so that movement near the security phone 10 will trigger an event. Once an event is triggered, security phone 10 takes itself off hook, and triggers its standard redial feature. The last dialed number will then be dialed, and the last called phone 14 will be called. Security phone leaves itself off hook for a predetermined period of time, for example one minute, so that a person at the called phone can listen in and determine whether something needs to be done to respond to the alarm.

Figure 2:
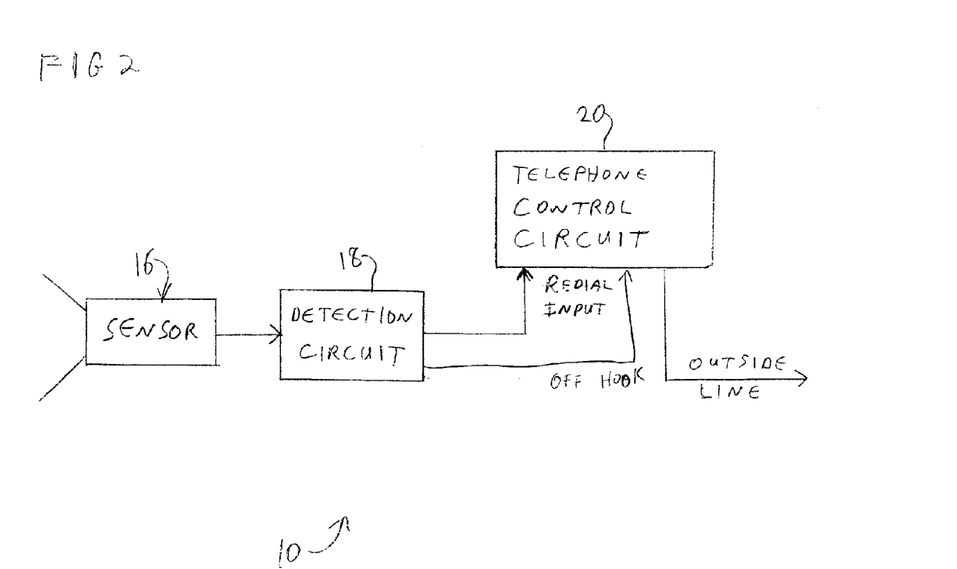
FIG. 2 is a block diagram of a preferred telephone security device.

FIG. 2 shows a high level block diagram of a preferred security circuit built into security phone 10. Sensor 16 is preferably in IR motion sensor, but can be any other sensor that is appropriate for performing a desired security function. Sensor 16 has an output connected to detection circuit 18, which determines the occurrence of a security event and operates selected functions of the telephone set. In particular, detection circuit 18 operates the off hook and redial inputs of telephone control circuit 20, which is generally a single integrated circuit device used to control operation of the telephone. Telephone control circuit 20 then connects to an outside line in a normal manner, and redials the last called number.

Figure 3:
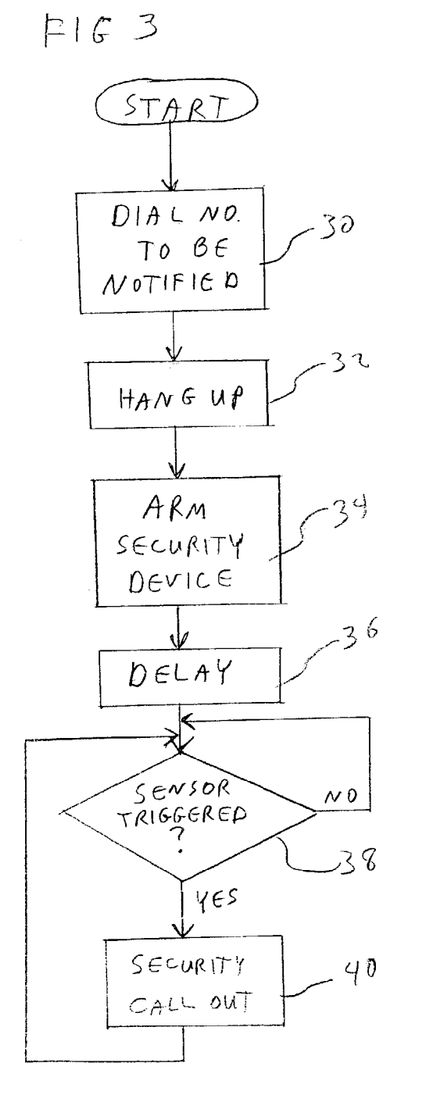
FIGS. 3 and 4 are flow charts illustrating a preferred mode of operation of the telephone security system.

FIG. 3 illustrates operation of the preferred embodiment of the security telephone. The user of the device dials the number to be notified, waits for one or two rings, and then hangs up 32. Alternatively, a conversation can be held with a person at the called telephone before hanging up. The called number would typically be a number of someone tasked with investigating security events, or an alternative number at which the user can be found. Examples of such numbers include a home number (for a security telephone at the office), a work number (for a security telephone at home), or a cell phone number.

After hanging up, the user arms the security device 34, preferably by simply moving a security switch to the on position. The security device then generates a delay 36 to allow the user time to leave the area near the security telephone. After this delay, the security feature of the phone is armed and operational. The device waits for the sensor to be triggered 38, and initiates a security call out 40 when it does. At the conclusion of the security call out, the unit returns to its sensing state to await future security events. The set will remain in this state until it is disarmed by returning the security switch to the off position.

Figure 4:
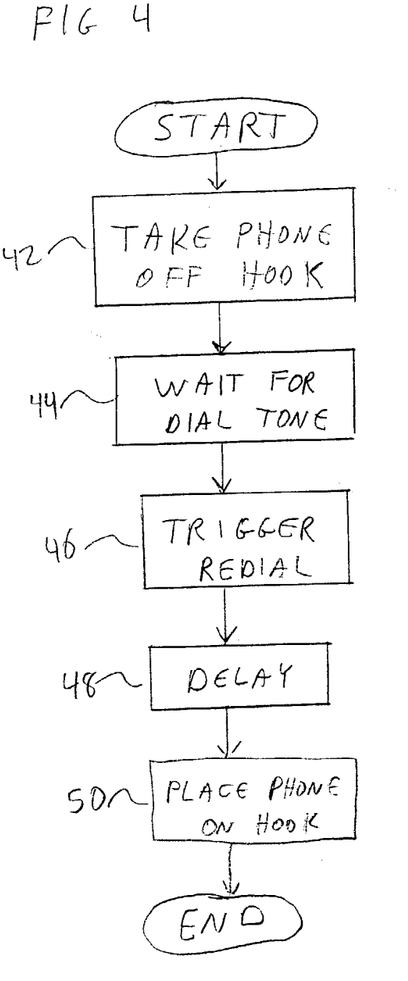

FIG. 4 illustrates the operations involved in a security call out. First, the device takes the telephone off hook to enable an outgoing call to be placed. This is preferably accomplished by applying an appropriate signal to an available input pin of the telephone control circuit. The unit waits for a dial tone 44, which is an optional step. If desired, the unit can move on to the next step, triggering the redial function of the telephone 46, without delay.

The redial function is triggered by applying a pulse signal to an appropriate pin of the telephone control circuit. This mimics the operation of pressing the redial button on the telephone handset. The telephone control circuit will then redial the last called number. A delay 48 is generated, so that the security telephone remains off hook for a predetermined period of time, after which it is returned to its on hook state 50. The predetermined delay is selected to be long enough to allow the recipient of the security call out to listen to any sounds made near the security telephone, and determine whether any additional action needs to be taken. Once the telephone is returned to the on hook state, it is enabled to allow further security events to trigger an additional call out.

Figure 5:
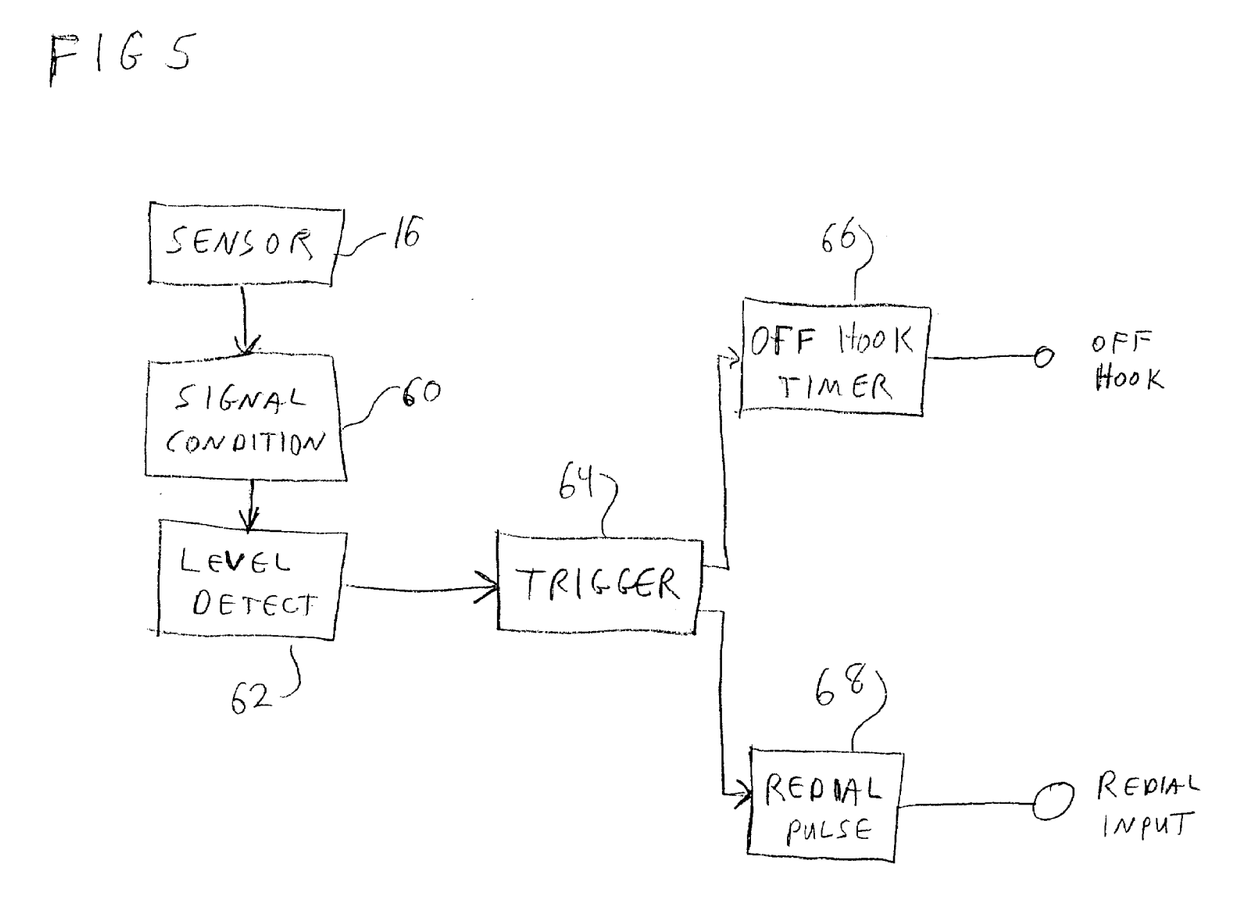
FIG. 5 is a block diagram of the preferred telephone security device.

FIG. 5 is a block diagram of a preferred circuit for implementing the security features described above. Sensor 16 is connected to a signal conditioning circuit 60, the nature of which depends on the operating specifications of sensor 16. Signal conditioning circuit 60 provides an output to level detect circuit 62, which generates an output signal when the output from signal conditioning circuit 60 is high enough to indicate that a security event has occurred. For example, if sensor 16 is an IR motion detector generating an amplitude modulated sinusoidal output, level detector 62 generates an output signal when the output amplitude of signal conditioner 60 is high enough to indicate that motion within the area has been detected.

Trigger circuit 64 is connected to the output of level detector 62, and initiates operation of off hook timer 66 and redial pulse generator 68. Off hook timer 66 is connected to an off hook input of the telephone controller, and generates a signal that takes the telephone off hook. A timer within circuit 66 keeps the telephone set off hook for a predetermined period of time, at which point the set is placed back on hook.

Redial pulse circuit 68 generates a short redial pulse, and applies it to the redial input of the telephone control circuit. This pulse causes the telephone control circuit to redial the last number dialed, as previously described.

Figure 6:
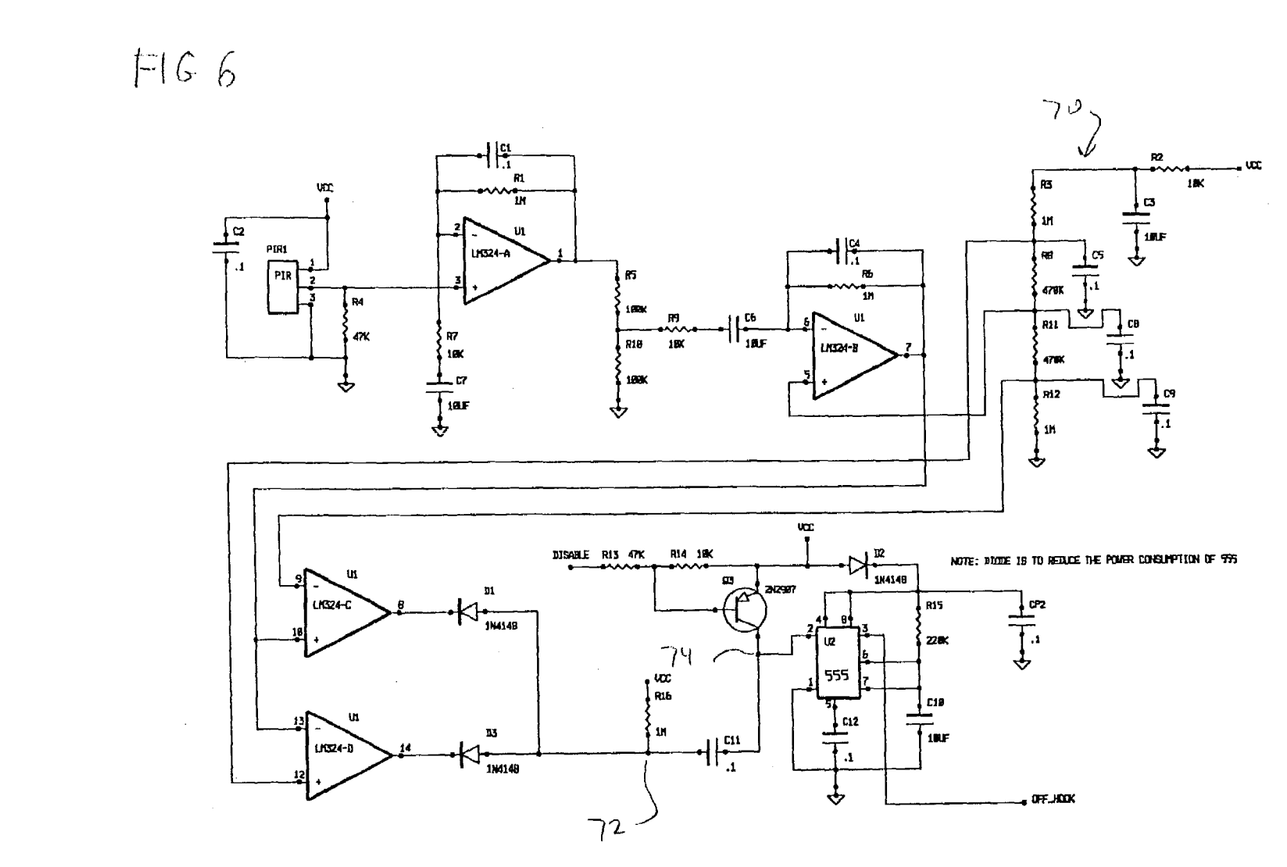
FIGS. 6 and 7 are schematic diagrams of a preferred embodiment of the telephone security device.
Figure 7:
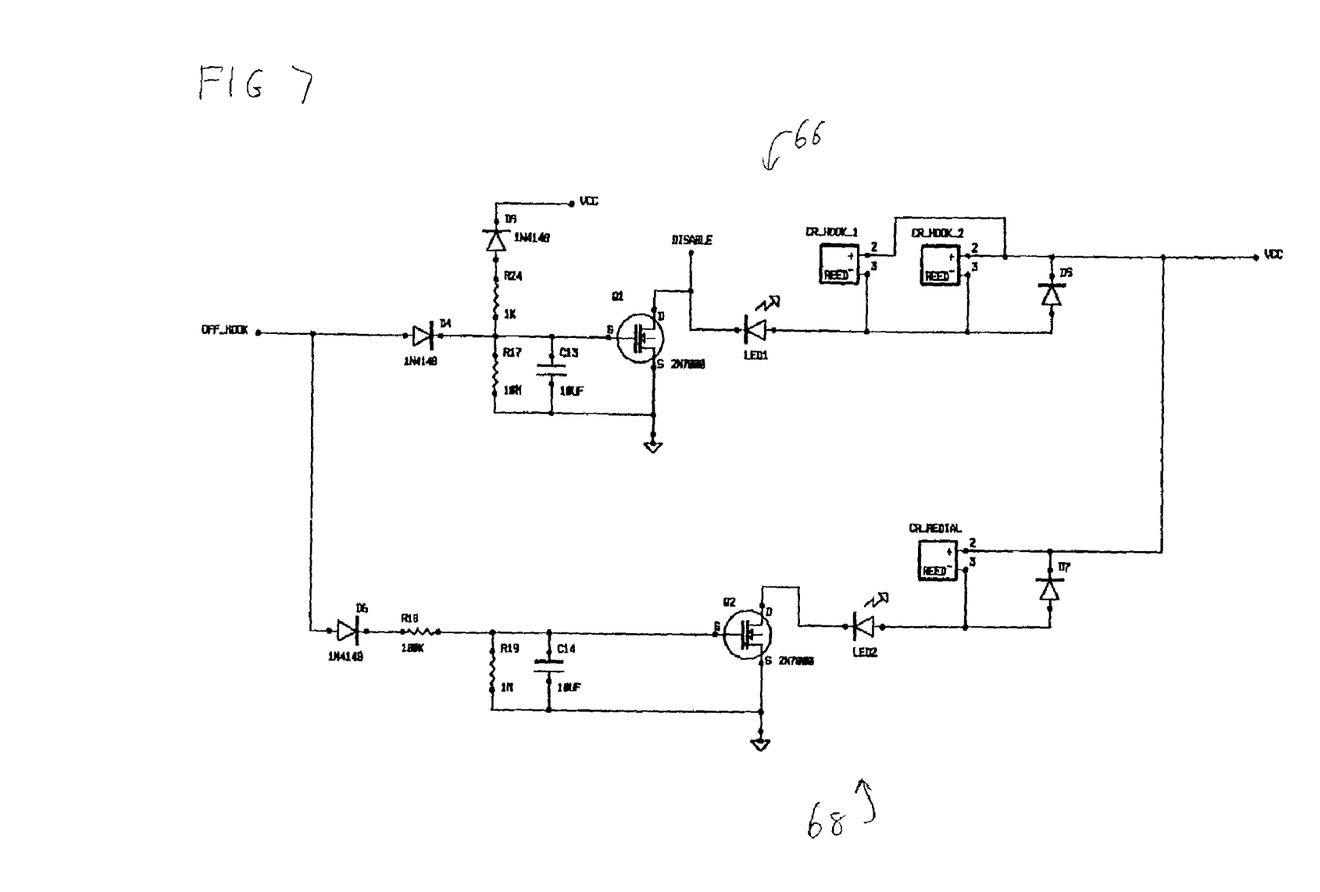
Figure 8:
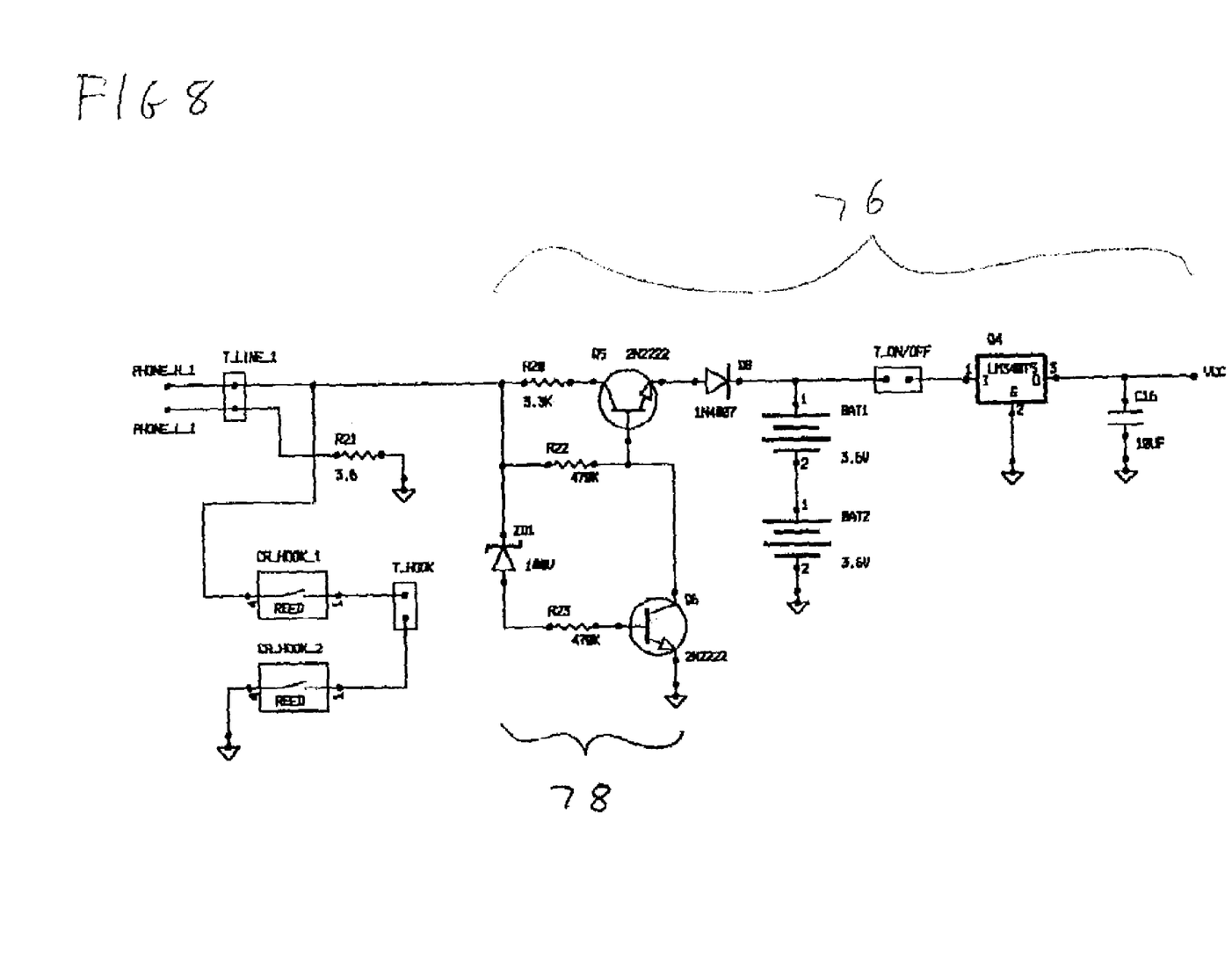
FIG. 8 is a schematic diagram of a preferred telephone line interface and charging circuit for operating the device set forth in FIGS. 6 and 7.

FIGS. 6–8 provide a more detailed schematic diagram of the preferred circuit. Referring to FIG. 6, sensor PIR1 is preferably an IR motion detector, part 22 number RE200B, available for order from glolab.com. PIR1 generates a sinusoidal output that varies in amplitude responsive to motion detected, with a higher amplitude output indicating motion detection. U1A and U1B are OP-AMPS utilized as amplifiers to condition the signal generated by PIR1. The output from U1B is connected to the negative and positive inputs, respectively, of U1C and U1D. Voltage divider ladder 70 provides an input to U1B for voltage level normalization, and voltage reference levels to U1C and U1D.

U1C an U1D provide the level detect function described in connection with FIG. 5. When the peak to peak amplitude of the sinusoid output from U1B is small, both U1C and U1D generate high outputs. When the peak amplitude output from U1B exceeds a preset limit, set by voltage divider 70, the outputs of U1C and U1D both go low. Node 72 is normally high, but is drawn low when the outputs of U1C and U1D go low. This draws the voltage at node 74 low for a short time defined by the time constant of R16 and C11.

Pulling the voltage at node 74 low triggers U2, preferably a 555 timer, to generate a pulse output on output pin 3. U2 preferably generates a pulse of approximately 200 ms, which is set by R15 and C10, connected to pins 6 and 7 as known in the art. This pulse is the signal OFF_HOOK, which indicates that a security event has been sensed. U2 and the associated circuitry correspond to trigger 64 in FIG. 5.

The signal DISABLE, generated as described below by the circuitry of FIG. 7, is used to disable U2 by forcing the voltage at node 74 to remain high. This prevents the 555 from triggering and generating another OFF_HOOK output pulse. When DISABLE is brought low, a voltage is generated across the base-emitter junction of Q3, turning Q3 on and connecting node 74 to VCC (high).

Referring to FIG. 7, the circuits for off hook timer 66 and redial pulse timer 68 are depicted. The OFF_HOOK pulse output from U2 charges up capacitors C13 and C14, connected to the inputs of n-channel transistors Q1 and Q2, respectively. C13 and C14, with associated resistors R17 and R19, respectively, determine time constants for how long Q1 and Q2 will be turned on by the voltages at their respective gates.

When OFF_HOOK goes high, C13 and C14 charge up to VCC, turning on both Q1 and Q2 and pulling the voltage at their respective drains to ground. This activates relay switches CR_HOOK_1 and CR_HOOK_2, driven by Q1, and CR_REDIAL, driven by Q2. LED1 and LED2 are optional, and are used to indicate that the security feature has been triggered. When OFF_HOOK goes low after 200 ms, C13 and C14 discharge through R17 and R19, respectively. In the example embodiment shown, R17 is ten times as large as R19, so capacitor C14 discharges in approximately one-tenth the time as C13.

When C14 goes low, Q2 turns off and the voltage at its drain goes high. This turns off relay CR_REDIAL, completing a pulse started when Q2 turned on. CR_REDIAL is connected to the redial input on the telephone controller chip, and upon completion of the pulse triggers the redial feature of the telephone. The delay caused by the discharge of Q2 ensures that a dial tone has been acquired before the redial is initiated.

When Q1 turns on, DISABLE is pulled low as previously described. This prohibits U2 from being triggered again while the phone is in the off hook condition. (If such were to happen, additional redials could be initiated during a single off hook period.) Q1 turning on also switches relays CR_HOOK_1 and CR_HOOK_2 on, placing the set into an off hook condition. The phone remains in the off hook state until C13 discharges and Q1 turns off.

FIG. 8 illustrates preferred circuitry for interfacing with the telephone line, and charging a battery used to provide power to the circuitry. As shown, CR_HOOK_1 and CR_HOOK_2 are switched by Q1, and connect to the hook input of the telephone control chip to take the phone off hook when activated. Trickle charge circuitry 76 provides a low current trickle to charge BAT1 and BAT2, which provide VCC during operation of the security circuitry. Q5 and Q6 provide a current of less than approximately 3 mA until BAT1 and BAT2 are charged, allowing the circuit to be charged through the telephone lines. If desired, as an alternative a power supply can be provided that operates off of wall voltages, but the design shown in FIG. 8 allows the unit to be extremely compact and included in a standard telephone handset.

A portion of trickle charge circuitry 76 acts as a high voltage rejection circuit 78. Transistors Q5 and Q6 operate to allow the trickle charging current through under normal operating conditions, but to block current during high voltage situations, such as occur when a ring voltage is present on the line. When the incoming voltage is high enough to overcome zener diode ZD1 and turn Q6 fully on, the base of Q5 is pulled to ground and Q5 turns off. This protect the batteries from high current draw, and prevents the device from drawing more current than is allowed by telephone company specifications.

Switch T_ON/OFF is the arming switch set by the user, and connects the batteries to VCC only when the switch is set. The remainder of the time, the security circuitry is disabled by removing its power supply.

It will be appreciated by those skilled in the art that the control circuitry described herein is an illustrative preferred embodiment, and that other circuitry performing the same functions may be devised. For example, the circuitry described herein is intended to retrofit an existing telephone set, and is therefore provided as circuitry external to the existing telephone control chip. However, it is also useful to incorporate the functions described herein into the design of the telephone control chip itself, which would necessitate various changes to operate with the internal circuitry of the controller.

Although the preferred embodiment has described the use of a motion sensor, other sensors can be used if desired. For example, sound or smoke detectors could be used, as well as any sensor that responds to changes in air pressure. A sensor could be wired to a door or window, or to trigger the device when an electric eye beam or other indicator is tripped. Also, although the preferred sensor is an IR motion sensor, other types of motion sensors that respond to other modes of sensing, such as ultrasound, can be used if desired. When any different type of sensor is used, the signal conditioning 60 and level detect circuitry 62 will need to be modified to properly interface with the sensor actually used.

The preferred embodiment is designed to be added to a simple electronic telephone set such as is widely available. However, it can be adapted to be included in a cordless telephone, either in the base unit or the portable unit as desired, as will be appreciated by those skilled in the art. If added to the base unit of a cordless telephone, many designs will require that the base unit be able to send an appropriate signal to the portable unit to trigger the redial feature as described herein.

The described security device is very simple and inexpensive to produce, and can be retrofit to an existing telephone, or incorporated into a new device. In operation, the user need merely dial the number to which a notification call is desired, and arm the device by setting a single switch. The security device takes advantage of the pre-existing redial feature of the phone, and does not require the usual relatively complex interfacing and operation heretofore known in the prior art. This results in a flexible and marketable product that answers a security need that has heretofore not been addressed.

Additional features can be incorporated into the device if desired. Using the described circuitry, each telephone set is independent, and it is possible that two separate extensions on a single line could be triggered independently by a single intruder. This would cause the second phone to redial while the first phone was already off hook, and possibly being monitored by the recipient of the call. This might be desirable in some circumstances, as the total time that the area was monitored would increase (the second phone would remain on line when the first hung up), but not in others. A circuit for sensing that the line was already active could be used to suppress triggering the redial, if desired, to address this issue.

While the invention has been particularly shown and described with reference to a preferred embodiment, it will be understood by those skilled in the art that various changes in form and detail may be made therein without departing from the spirit and scope of the invention.

What is claimed is:

1. A telephone security device, comprising:
   a telephone handset having a housing, and capable of being used by a user to place telephone calls to any desired number over a telephone line;

an electronic controller within the telephone handset, such controller having an off-hook input pin that, in response to an applied voltage signal, places the telephone handset in an off-hook condition, and further having a redial input pin that, in response to an applied voltage signal, causes the telephone handset to dial out, over an external telephone line, a last number previously dialed from the telephone handset;

a sensor within the telephone handset housing for detecting an event in an area near the telephone handset;

a switch on the telephone handset housing, having a first position and a second position, wherein the switch places the telephone handset into a security active state when in the first position, and not when the switch is in the second position; and a control circuit, within the telephone handset housing and connected to the switch, and connected to the sensor and to the electronic controller for, when the sensor detects an event while the telephone handset is in the security active state, sequentially applying voltage signals to the off-hook input pin and the redial input pin;

wherein the voltage signals are not applied to the off-hook and redial input pins when the telephone handset is not in the security active state, and wherein moving the switch from the second position to the first position places the telephone handset into the security active state only after a delay period.

2. The telephone security device of claim 1, wherein the sensor comprises an infrared motion sensor.

3. The telephone security device of claim 1, wherein the sensor comprises a sound detector.

4. The telephone security device of claim 1, wherein the sensor comprises a smoke detector.

5. The telephone security device of claim 1, further comprising:
   a battery connected to the control circuit for supplying operating power thereto.

6. The telephone security device of claim 5, further comprising:
   a charging circuit connected to the external telephone line and to the battery, wherein the charging circuit operates to charge the battery with current drawn from the external telephone line.

7. The telephone security device of claim 6, wherein the charging circuit contains current limiting circuitry to limit the current drawn by the charging circuit to less than approximately 3 mA.

8. The telephone security device of claim 6, wherein the charging circuit contains circuitry to prevent charging of the battery when a high voltage is present on the external line.

9. The telephone security device of claim 1, wherein the delay period after moving the switch from the second position to the first position is a preselected time period.

10. The telephone security device of claim 1, wherein voltage signals are sequentially applied to the off-hook pin and to the redial pin during the delay period, and before the telephone handset is placed into the security active state.

11. A method for controlling the operation of a telephone device connected to a telephone line and capable of being used to place telephone calls to numbers desired by a user, the telephone device further having a redial function, comprising the steps of:
   arming the telephone device to place it into a security active state;
   when the telephone device is in the security active state, performing the steps of:
      electronically sensing the presence of activity in a room in which the telephone device is located;
      placing the telephone device in an off-hook condition;
      activating the redial function of the telephone device, whereby a most recently called number is dialed; and
      maintaining the telephone device in an off-hook condition for a predetermined time period, whereby a called party at the most recently called number is enabled to listen to sounds in the vicinity of the telephone device;
   wherein the sensing step is disabled for a delay period after the arming step.

12. The method of claim 11, wherein the step of electronically sensing comprises the step of sensing motion using an infrared motion detector.

13. The method of claim 11, further comprising the step of:
   after the predetermined time period, placing the telephone device into an on-hook condition.

14. The method of claim 11, wherein the delay period is a preselected time period.

15. The method of claim 11, wherein the delay period is defined by one cycle of the placing, activating, and maintaining steps.

16. The method of claim 11, further comprising the step of:
   after the step of placing the telephone device in an off-hook condition, waiting for a dial tone on a telephone line before the step of activating the redial function of the telephone device.

* * * * *